(12) United States Patent
Hirata

(10) Patent No.: US 10,112,256 B2
(45) Date of Patent: Oct. 30, 2018

(54) SIC WAFER PRODUCING METHOD

(71) Applicant: DISCO CORPORATION, Tokyo (JP)

(72) Inventor: Kazuya Hirata, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 15/663,189

(22) Filed: Jul. 28, 2017

(65) Prior Publication Data
US 2018/0043468 A1 Feb. 15, 2018

(30) Foreign Application Priority Data
Aug. 10, 2016 (JP) .................................. 2016-157879

(51) Int. Cl.
| | |
|---|---|
| B23K 26/53 | (2014.01) |
| B23K 26/00 | (2014.01) |
| B23K 26/0622 | (2014.01) |
| B28D 5/00 | (2006.01) |
| B23K 103/00 | (2006.01) |

(52) U.S. Cl.
CPC ...... *B23K 26/0057* (2013.01); *B23K 26/0006* (2013.01); *B23K 26/0622* (2015.10); *B23K 26/53* (2015.10); *B28D 5/0011* (2013.01); *B23K 2203/56* (2015.10)

(58) Field of Classification Search
CPC ................ B23K 26/0057; B23K 26/53; B23K 26/0622; B23K 2203/56; B28D 5/0011
See application file for complete search history.

(56) References Cited

U.S. PATENT DOCUMENTS

| | | | | |
|---|---|---|---|---|
| 2004/0002199 A1* | 1/2004 | Fukuyo | .............. | B23K 26/0057 438/460 |
| 2011/0159621 A1* | 6/2011 | Endo | .................. | B23K 26/0057 438/34 |
| 2012/0092755 A1* | 4/2012 | Baird | .................. | H01S 3/09415 359/328 |
| 2013/0126573 A1* | 5/2013 | Hosseini | ............ | B23K 26/0057 225/2 |
| 2017/0301549 A1* | 10/2017 | Suzuki | ................. | B23K 26/402 |
| 2018/0043468 A1* | 2/2018 | Hirata | ................ | B23K 26/0057 |
| 2018/0085851 A1* | 3/2018 | Hirata | ................ | B23K 26/0057 |
| 2018/0108568 A1* | 4/2018 | Wang | .................. | H01L 21/7813 |

(Continued)

FOREIGN PATENT DOCUMENTS

| | | |
|---|---|---|
| JP | 2000-094221 | 4/2000 |
| JP | 2013-049161 | 3/2013 |

*Primary Examiner* — Sean Michalski
(74) *Attorney, Agent, or Firm* — Greer Burns & Crain Ltd.

(57) ABSTRACT

An SiC wafer is produced from a single crystal SiC ingot by a method that includes forming a plurality of breakable layers constituting a separation surface in the SiC ingot, each breakable layer including a modified layer and cracks extending from the modified layer along a c-plane, and separating part of the SiC ingot along the separation surface as an interface to thereby produce the SiC wafer. In forming the separation surface, the energy density of a pulsed laser beam is set to an energy density not causing the formation of an upper damage layer above the breakable layer previously formed due to the reflection of the pulsed laser beam from the breakable layer and not causing the formation of a lower damage layer below the breakable layer previously formed due to the transmission of the pulsed laser beam through the breakable layer.

2 Claims, 9 Drawing Sheets

(56) References Cited

U.S. PATENT DOCUMENTS

2018/0118562 A1\* 5/2018 Drescher ............. B81C 1/00357
2018/0126484 A1\* 5/2018 Richter .............. B23K 26/0057
2018/0133834 A1\* 5/2018 Beyer ................ B23K 26/0057

\* cited by examiner

FIG.5

|  |  | FEED SPEED V[mm/s] | | | | | | | |
|---|---|---|---|---|---|---|---|---|---|
|  |  | TEST1 | TEST2 | TEST3 | TEST4 | TEST5 | TEST6 | TEST7 | TEST8 |
|  |  | 100 | 200 | 300 | 400 | 500 | 600 | 700 | 800 |
| AVERAGE POWER [W] | 0.2 | × | × | × | × | × | × | × | × |
|  | 0.4 | ● | × | × | × | × | × | × | × |
|  | 0.6 | ● | ● | × | × | × | × | × | × |
|  | 0.8 | ● | ● | × | × | × | × | × | × |
|  | 1.0 | ● | ● | ● | × | × | × | × | × |
|  | 1.2 | ● | ● | ● | × | × | × | + | + |
|  | 1.4 | ● | ● | ● | × | × | × | + | + |
|  | 1.6 | ● | ● | ● | × | × | × | + | + |
|  | 1.8 | △ | ● | ● | × | × | × | + | + |
|  | 2.0 | △ | ● | ● | ● | × | × | + | + |
|  | 2.2 | △ | △ | ● | ● | × | × | + | + |
|  | 2.4 | △ | △ | ● | ● | × | × | + | + |
|  | 2.6 | △ | △ | ● | ● | × | × | + | + |
|  | 2.8 | △ | △ | ● | ● | × | × | + | + |
|  | 3.0 | □ | □ | △ | ● | ● | × | + | + |
|  | 3.2 | □ | □ | □ | ● | ● | × | + | + |
|  | 3.4 | □ | □ | □ | ◇ | ● | × | + | + |
|  | 3.6 | □ | □ | □ | ◇ | ● | × | + | + |
|  | 3.8 | □ | ◇ | □ | ◇ | ◇ | ● | + | + |
|  | 4.0 | □ | ◇ | □ | ◇ | ◇ | ● | + | + |
|  | 4.2 | □ | ◇ | □ | ◇ | ◇ | ◇ | + | + |
|  | 4.4 | □ | □ | □ | ◇ | ◇ | ◇ | + | + |
|  | 4.6 | □ | ◇ | □ | ◇ | ◇ | ◇ | + | + |
|  | 4.8 | □ | ◇ | □ | ◇ | ◇ | ◇ | + | + |
|  | 5.0 | □ | □ | ◇ | ◇ | ◇ | ◇ | + | + |

● : Good breakable layer was formed.
× : No breakable layer was formed.
△ : Damage layer was formed only above breakable layer.
□ : Damage layers were formed above and below breakable layer.
◇ : Damage layer was formed only below breakable layer.
+ : Only damage layer was formed.

SIC WAFER PRODUCING METHOD

BACKGROUND OF THE INVENTION

Field of the Invention

The present invention relates to an SiC wafer producing method for producing an SiC wafer from a single crystal SiC ingot.

Description of the Related Art

Various devices such as integrated circuits (ICs), large-scale integrations (LSIs), and light-emitting diodes (LEDs) are formed by forming a functional layer on the front side of a wafer formed of Si (silicon) or $Al_2O_3$ (sapphire) and partitioning this functional layer into a plurality of separate regions along a plurality of division lines. Further, power devices or optical devices such as LEDs are formed by forming a functional layer on the front side of a wafer formed of single crystal SiC (silicon carbide) and partitioning this functional layer into a plurality of separate regions along a plurality of division lines. The division lines of such a wafer having these devices are processed by a processing apparatus such as a cutting apparatus and a laser processing apparatus to thereby divide the wafer into a plurality of individual device chips corresponding to the devices. The device chips thus obtained are used in various electrical equipment such as mobile phones and personal computers.

In general, the wafer on which the devices are to be formed is produced by slicing a cylindrical ingot with a wire saw. Both sides of the wafer sliced from the ingot are polished to a mirror finish (see Japanese Patent Laid-Open No. 2000-94221). However, when the ingot is cut by the wire saw and both sides of each wafer are polished to obtain the product, a large proportion (70% to 80%) of the ingot is discarded to cause a problem of poor economy. In particular, a single crystal SiC ingot has high hardness and it is therefore difficult to cut this ingot with the wire saw. Accordingly, considerable time is required for cutting of the ingot, causing a reduction in productivity. Furthermore, since this ingot is high in unit price, there is a problem in efficiently producing a wafer in this prior art.

A technique for solving this problem has been proposed (see Japanese Patent Laid-Open No. 2013-49161). This technique includes the steps of setting the focal point of a laser beam having a transmission wavelength to SiC inside an SiC ingot, next applying the laser beam to the SiC ingot as scanning the laser beam on the ingot to thereby form modified layers in a separation plane previously set inside the ingot, and next breaking the ingot along the separation plane where the modified layers are formed, thus separating an SiC wafer from the SiC ingot. However, in producing the SiC wafer from the SiC ingot by using this prior art technique, there is a problem such that the modified layers must be densely formed with a pitch of approximately 10 μm, causing a reduction in productivity.

SUMMARY OF THE INVENTION

It is therefore an object of the present invention to provide an SiC wafer producing method which can improve the productivity of wafers.

In accordance with an aspect of the present invention, there is provided an SiC wafer producing method for producing an SiC wafer from a single crystal SiC ingot having a first surface, a second surface opposite to the first surface, a c-axis extending from the first surface to the second surface, and a c-plane perpendicular to the c-axis, the c-axis being inclined by an off angle with respect to a normal to the first surface, the off angle being formed between the c-plane and the first surface, the SiC wafer producing method including a breakable layer forming step of setting a focal point of a pulsed laser beam having a transmission wavelength to SiC inside the SiC ingot at a predetermined depth from the first surface, the predetermined depth corresponding to the thickness of the SiC wafer to be produced, and next applying the pulsed laser beam to the SiC ingot as relatively moving the SiC ingot and the focal point in a first direction perpendicular to a second direction where the off angle is formed, thereby forming a breakable layer inside the SiC ingot at the predetermined depth, the breakable layer including a modified layer extending in the first direction and cracks extending from the modified layer in opposite directions along the c-plane, the modified layer being formed in such a manner that SiC is decomposed into Si and C by the pulsed laser beam first applied, and the pulsed laser beam next applied is absorbed by C previously produced to continue the decomposition of SiC into Si and C in a chain reaction manner with the relative movement of the SiC ingot and the focal point in the first direction; a separation surface forming step of relatively indexing the SiC ingot and the focal point in the second direction and performing the breakable layer forming step plural times to thereby form a plurality of breakable layers constituting a separation surface; and a wafer producing step of separating part of the SiC ingot along the separation surface as an interface to thereby produce the SiC wafer; the separation surface forming step including the step of setting the energy density of the pulsed laser beam to an energy density not causing the formation of an upper damage layer above the breakable layer previously formed due to the reflection of the pulsed laser beam from the breakable layer or not causing the formation of a lower damage layer below the breakable layer previously formed due to the transmission of the pulsed laser beam through the breakable layer.

Preferably, the energy density per pulse E ($J/cm^2$) of the pulsed laser beam and the feed speed V (mm/second) of the SiC ingot satisfy the conditions of $0<V\leq 600$ and $0.184\leq E$ and the energy density per pulse E is set to $-0.35+0.0042\times(V-100)\leq E \leq 0.737+0.0024\times(V-100)$.

According to the SiC wafer producing method of the present invention, the separation surface forming step includes the step of setting the energy density of the pulsed laser beam to an energy density not causing the formation of an upper damage layer above the breakable layer previously formed due to the reflection of the pulsed laser beam from the breakable layer or not causing the formation of a lower damage layer below the breakable layer previously formed due to the transmission of the pulsed laser beam through the breakable layer. Accordingly, a good breakable layer can be formed without the formation of a damage layer above or below the breakable layer. In the SiC wafer producing method of the present invention, a damage layer is not formed above or below the breakable layer. Accordingly, there is no possibility that the quality of the SiC wafer may be reduced and that the amount of the ingot to be removed by grinding may be increased to cause a reduction in productivity. As a result, the amount of an ingot portion to be discarded can be reduced to thereby improve the productivity.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 5 is a graph depicting test results;

DETAILED DESCRIPTION OF THE PREFERRED EMBODIMENT

Figure 1:
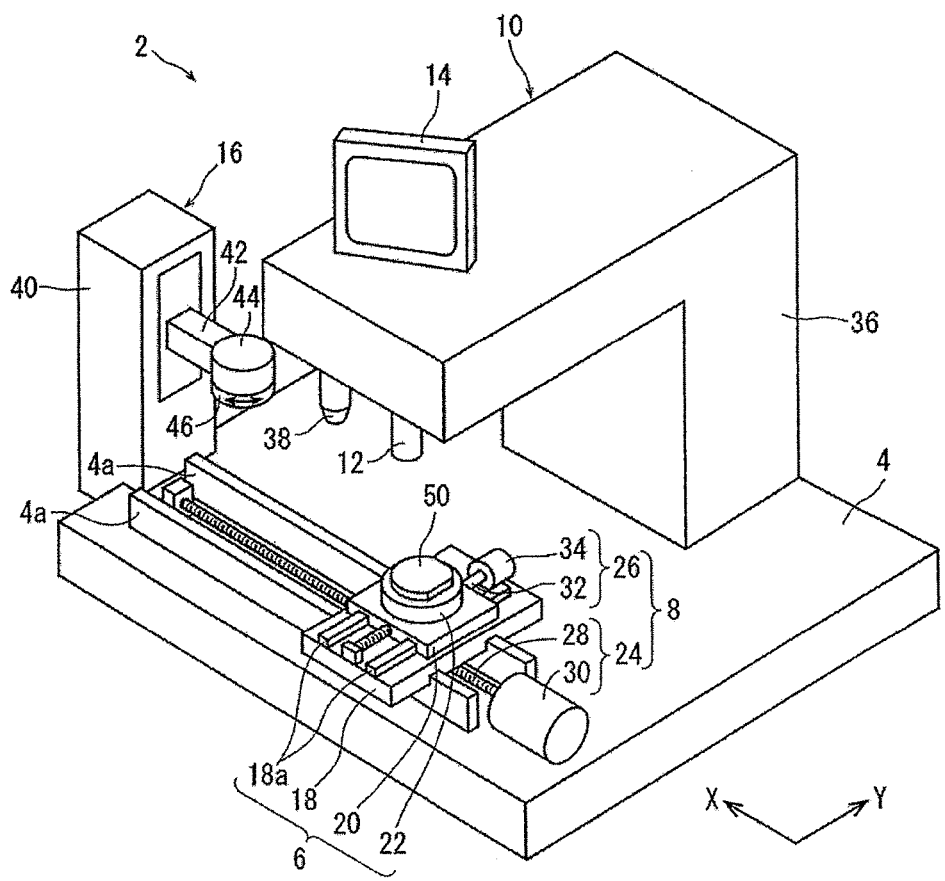
FIG. 1 is a perspective view of a laser processing apparatus.

A preferred embodiment of the SiC wafer producing method according to the present invention will now be described with reference to the drawings. FIG. 1 is a perspective view of a laser processing apparatus 2 for performing the SiC wafer producing method according to this preferred embodiment. The laser processing apparatus 2 depicted in FIG. 1 includes a base 4, holding means 6, moving means 8 for moving the holding means 6, laser beam applying means 10, imaging means 12, display means 14, and separating means 16.

The holding means 6 includes a rectangular X movable plate 18 mounted on the base 4 so as to be movable in an X direction, a rectangular Y movable plate 20 mounted on the X movable plate 18 so as to be movable in a Y direction, and a cylindrical chuck table 22 rotatably mounted on the upper surface of the Y movable plate 20. The X direction is defined as the direction depicted by an arrow X in FIG. 1, and the Y direction is defined as the direction depicted by an arrow Y in FIG. 1, which is perpendicular to the X direction in an XY plane. The XY plane defined by the X direction and the Y direction is a substantially horizontal plane.

The moving means 8 includes X moving means 24, Y moving means 26, and rotating means (not depicted). The X moving means 24 includes a ball screw 28 extending in the X direction on the base 4 and a motor 30 connected to one end of the ball screw 28. The ball screw 28 has a nut portion (not depicted), which is fixed to the lower surface of the X movable plate 18. The X moving means 24 is operated in such a manner that the rotary motion of the motor 30 is converted into a linear motion by the ball screw 28 and this linear motion is transmitted to the X movable plate 18, so that the X movable plate 18 is moved in the X direction along a pair of guide rails 4a provided on the base 4.

Similarly, the Y moving means 26 includes a ball screw 32 extending in the Y direction on the X movable plate 18 and a motor 34 connected to one end of the ball screw 32. The ball screw 32 has a nut portion (not depicted), which is fixed to the lower surface of the Y movable plate 20. The Y moving means 26 is operated in such a manner that the rotary motion of the motor 34 is converted into a linear motion by the ball screw 32 and this linear motion is transmitted to the Y movable plate 20, so that the Y movable plate 20 is moved in the Y direction along a pair of guide rails 18a provided on the X movable plate 18. The rotating means has a motor (not depicted) built in the chuck table 22 to rotate the chuck table 22 with respect to the Y movable plate 20.

The laser beam applying means 10 includes an L-shaped casing 36 provided on the base 4 at its rear end portion, oscillating means (not depicted) built in the casing 36, focusing means 38 mounted on the lower surface of the casing 36 at its front end portion, and focal position adjusting means (not depicted). The L-shaped casing 36 includes a vertical portion extending upward from the upper surface of the base 4 and a horizontal portion extending from the upper end of the vertical portion in a substantially horizontal direction. Although not depicted, the oscillating means includes a laser oscillator for oscillating a pulsed laser beam LB, frequency setting means for setting the repetition frequency F of the pulsed laser beam LB to be oscillated from the laser oscillator, and power adjusting means for adjusting the power of the pulsed laser beam LB oscillated from the laser oscillator. The focusing means 38 has a focusing lens (not depicted) for focusing the pulsed laser beam LB oscillated from the laser oscillator. The imaging means 12 is provided on the lower surface of the front end portion of the casing 36 so as to be spaced from the focusing means 38 in the X direction. The display means 14 is mounted on the upper surface of the front end portion of the casing 36 to display an image obtained by the imaging means 12.

The separating means 16 includes a columnar casing 40 extending upward from the upper surface of the base 4 at a position near the left ends of the guide rails 4a as viewed in FIG. 1. The separating means 16 further includes an arm 42 having a base end vertically movably supported to the casing 40 and a front end projecting from the casing 40 so as to extend in the X direction. Although not depicted, elevating means for vertically moving the arm 42 is built in the casing 40. A motor 44 is provided at the front end of the arm 42. A disk-shaped suction member 46 is connected to the lower surface of the motor 44 so as to be rotatable about a vertical axis. The lower surface of the suction member 46 is formed with a plurality of suction holes (not depicted), which are connected through a suction passage to suction means (not depicted). Further, ultrasonic vibration applying means (not depicted) is built in the suction member 46 to apply ultrasonic vibration to the lower surface of the suction member 46.

Figure 2A:
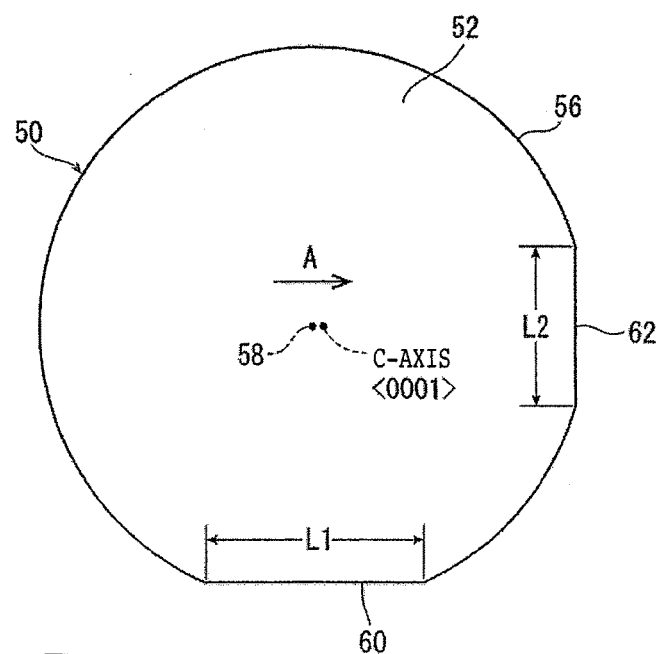
FIG. 2A is a plan view of a single crystal SiC ingot.
Figure 2B:
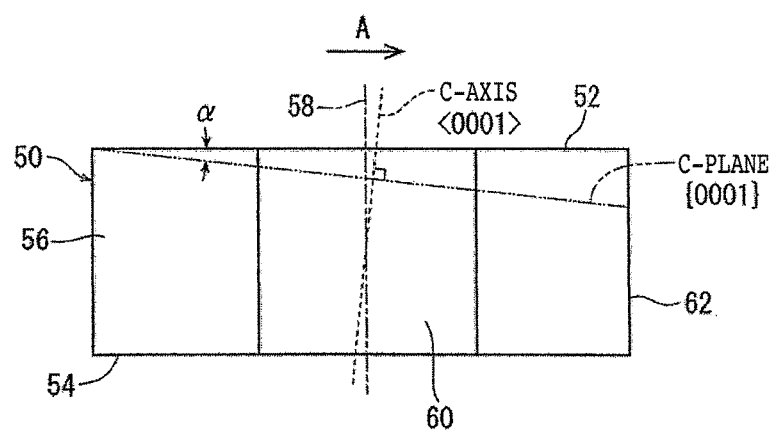
FIG. 2B is an elevational view of the SiC ingot depicted in FIG. 2A.

FIGS. 2A and 2B depict a generally cylindrical hexagonal single crystal SiC ingot 50 (which will be hereinafter referred to simply as "ingot 50") as a workpiece to be processed. The ingot 50 has a substantially circular first surface 52, a substantially circular second surface 54 opposite to the first surface 52, a substantially cylindrical surface 56 formed so as to connect the first surface 52 and the second surface 54, a c-axis (<0001> direction) extending from the first surface 52 to the second surface 54, and a c-plane ({0001} plane) perpendicular to the c-axis. In the ingot 50, the c-axis is inclined by an off angle α with respect to a normal 58 to the first surface 52. The off angle α (e.g., α=4 degrees) is formed between the c-plane and the first surface 52 (the direction of formation of the off angle α is depicted by an arrow A in FIGS. 2A and 2B). Further, the cylindrical surface 56 of the ingot 50 is formed with a first orientation flat 60 and a second orientation flat 62, which are rectangular in side elevation and function to indicate crystal orientation. The first orientation flat 60 is parallel to the direction A of formation of the off angle α, and the second orientation flat 62 is perpendicular to the direction A of formation of the off angle α. As depicted in FIG. 2A, which is a plan view taken in the direction of extension of the normal 58, the length L2 of the second orientation flat 62 is set shorter than the length L1 of the first orientation flat 60 (L2<L1).

There will now be described an SiC wafer producing method using the laser processing apparatus 2. First, as depicted in FIG. 1, the ingot 50 is fixed to the chuck table 22 in the condition where an adhesive (e.g., epoxy resin adhesive) is interposed between the second surface 54 of the ingot 50 and the upper surface of the chuck table 22. As a modification, the upper surface of the chuck table 22 may be formed with a plurality of suction holes, whereby a suction force may be produced on the upper surface of the chuck table 22 to thereby hold the ingot 50 under suction. Thereafter, the moving means 8 is operated to move the chuck table 22 to a position below the imaging means 12, and the imaging means 12 is next operated to image the ingot 50.

Figure 3A:
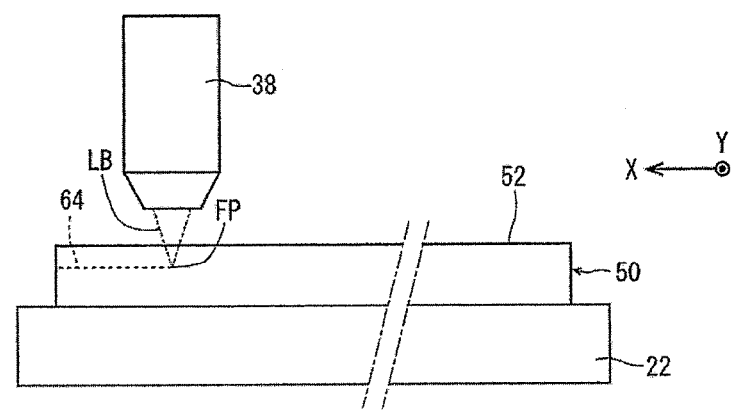
FIG. 3A is an elevational view depicting a separation surface forming step.
Figure 3B:
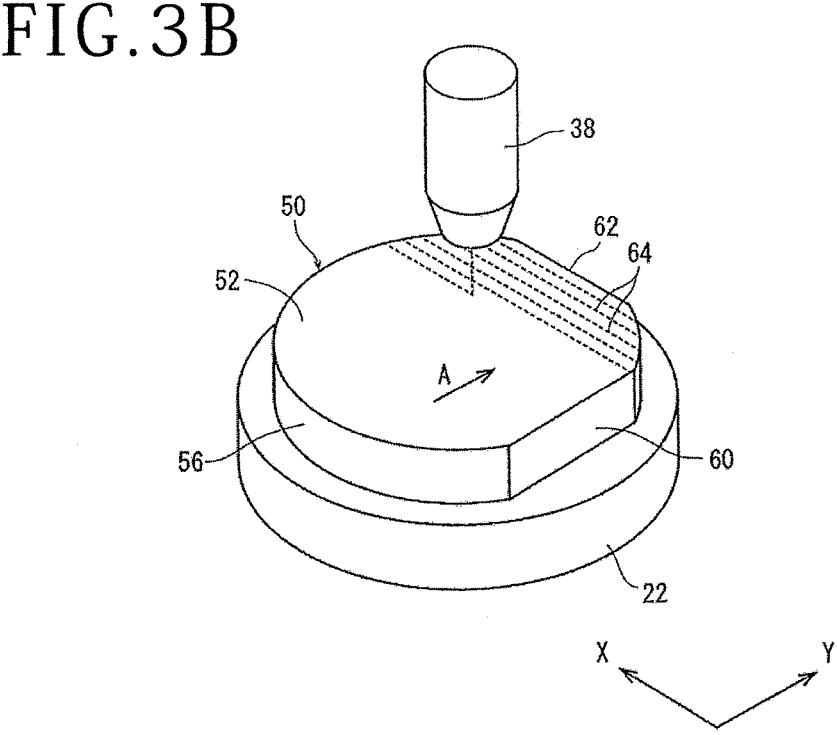
FIG. 3B is a perspective view depicting the separation surface forming step depicted in FIG. 3A.

Thereafter, a separation surface forming step is performed. In the separation surface forming step, the moving means 8 is first operated to move and rotate the chuck table 22 according to the image of the ingot 50 detected by the imaging means 12, thereby adjusting the orientation of the ingot 50 to a predetermined orientation and also adjusting the positional relation between the ingot 50 and the focusing means 38 in the XY plane. In adjusting the orientation of the ingot 50 to a predetermined orientation, the first orientation flat 60 is made parallel to the Y direction and the second orientation flat 62 is made parallel to the X direction as depicted in FIG. 3B. Accordingly, the direction A of formation of the off angle α is made parallel to the Y direction, and the direction perpendicular to the direction A of formation of the off angle α is made parallel to the X direction. Thereafter, the focal position adjusting means is operated to vertically move the focusing means 38, thereby setting a focal point FP inside the ingot 50 at a predetermined depth from the first surface 52, wherein this predetermined depth corresponds to the thickness of a wafer to be produced. Thereafter, as depicted in FIGS. 3A and 3B, a pulsed laser beam LB having a transmission wavelength to SiC is applied from the focusing means 38 to the ingot 50 as moving the chuck table 22 relative to the focal point FP at a predetermined feed speed V in the X direction (i.e., in the direction perpendicular to the direction A of formation of the off angle α) by operating the X moving means 24. As a result, a breakable layer 64 is formed inside the ingot 50 along a line in the X direction (breakable layer forming step).

Figure 4A:
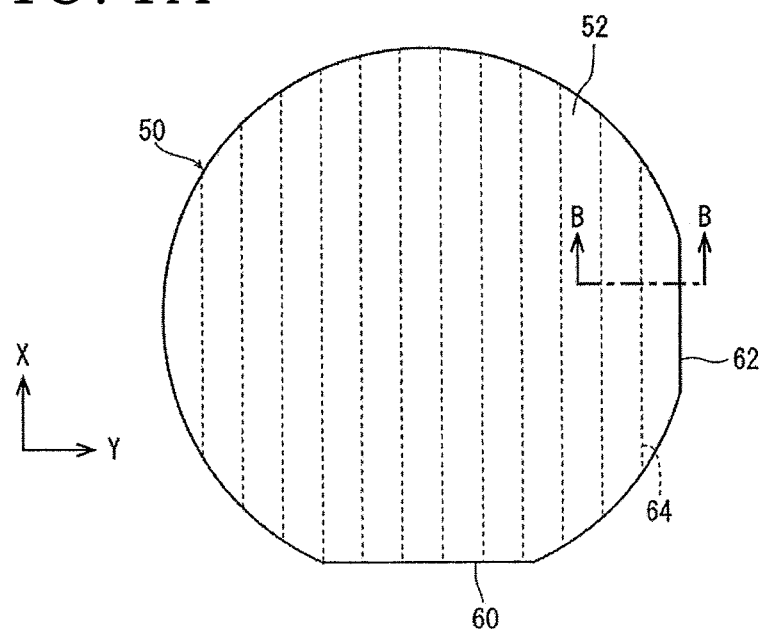
FIG. 4A is a plan view of the SiC ingot in which a separation surface has been formed by performing the separation surface forming step.
Figure 4B:
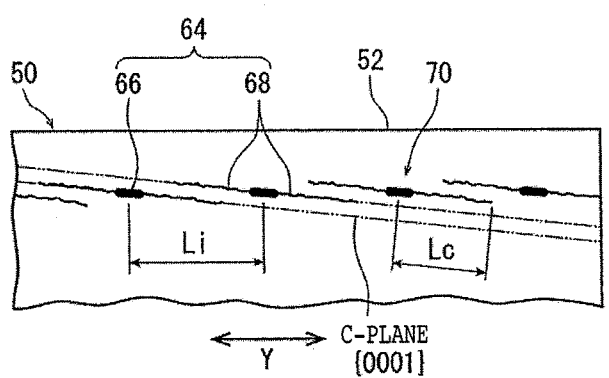
FIG. 4B is a cross section taken along the line B-B in FIG. 4A.

In the breakable layer forming step, the pulsed laser beam LB is initially applied to the ingot 50 to thereby decompose SiC into Si (silicon) and C (carbon). Thereafter, the pulsed laser beam LB is next applied to the ingot 50 and absorbed by C previously produced. Thus, SiC is decomposed into Si and C in a chain reaction manner with the movement of the chuck table 22 in the X direction to thereby for a modified layer 66 extending in the X direction. At the same time, cracks 68 (see FIG. 4B) are also formed so as to extend from the modified layer 66 in opposite directions along the c-plane. In this manner, the modified layer 66 and the cracks 68 constitute the breakable layer 64. As depicted in FIG. 4B, the modified layer 66 extending in the X direction (i.e., in the direction perpendicular to the direction A of formation of the off angle α) is present in the same c-plane and flattened along the c-plane. Further, the modified layer 66 has void. Further, the length Lc of each crack 68 extending from the modified layer 66 in one direction is approximately 250 μm. In the breakable layer forming step, the chuck table 22 is fed in the X direction so that the adjacent spots of the pulsed laser beam LB applied to the ingot 50 are overlapped with each other at the depth where the modified layer 66 is formed. Accordingly, the pulsed laser beam LB is applied again to the modified layer 66 where SiC has been decomposed into Si and C. To ensure that the adjacent spots of the pulsed laser beam LB are overlapped with each other in the breakable layer forming step, the relation of G=(V/F)−D<0 must hold, where F is the repetition frequency (kHz) of the pulsed laser beam LB, V is the feed speed (mm/second) of the chuck table 22, and D is the diameter (μm) of each spot. Further, the overlap rate of the adjacent spots is defined as |G|/D.

After performing the breakable layer forming step along a line in the X direction, indexing is performed in such a manner that the chuck table 22 is moved relative to the focal point FP by a predetermined index amount Li (e.g., 250 μm) in the Y direction (i.e., in the direction A of formation of the off angle α) by operating the Y moving means 26. Thereafter, the breakable layer forming step is similarly performed along the next line in the X direction. Thereafter, the indexing and the breakable layer forming step are repeated plural times to thereby form a plurality of similar breakable layers 64 as depicted in FIGS. 4A and 4B. Thus, a separation surface 70 is formed by these plural breakable layers 64.

In the separation surface forming step, the energy density of the pulsed laser beam LB must be set to an energy density not causing the formation of an upper damage layer above the breakable layer 64 previously formed due to the reflection of the pulsed laser beam LB from the breakable layer 64 or not causing the formation of a lower damage layer below the breakable layer 64 previously formed due to the transmission of the pulsed laser beam LB through the breakable layer 64. In this preferred embodiment, the energy density per pulse E (J/cm$^2$) and the feed speed V (mm/second) satisfy the following conditions:

$$0<V\leq 600 \qquad\text{(Eq. 1); and}$$

$$0.184\leq E \qquad\text{(Eq. 2).}$$

On the above conditions, the energy density per pulse E is set as follows:

$$-0.35+0.0042\times(V-100)\leq E\leq 0.737+0.0024\times(V-100) \qquad\text{(Eq. 3).}$$

The energy density E (J/cm$^2$) is defined by the average power P (W), the area S=ΠD$^2$/4 (cm$^2$) of the spot at the position where the modified layer 66 is formed, and the repetition frequency F (kHz) to give E=P/(S·F).

The reason for setting the relation between the energy density per pulse E (J/cm$^2$) and the feed speed V (mm/second) to the range specified by Eqs. 1 to 3 will now be described with reference to FIG. 5, which depicts the results of tests performed by the present inventor under the following test conditions.

(Test Conditions)
  Wavelength of the pulsed laser beam: 1064 nm
  Repetition frequency: 30 kHz
  Average power: 0.2 to 5.0 W
  Diameter of the focal point: 1 μm
  Numerical aperture (NA) of the focusing lens: 0.65

Position of the focal point: Position obtained by lowering the focusing means by 120 μm from the condition where the focal point was set on the upper surface of the ingot.

Refractive index of SiC: 2.65

Index amount: 250 μm

Feed speed: 100 to 800 mm/second (Test 1)

A single crystal SiC ingot having a thickness of 1 mm was held on the chuck table 22 and the pulsed laser beam was applied to the ingot as moving the chuck table 22 at a feed speed of 100 mm/second in the direction perpendicular to the direction of formation of the off angle, wherein the average power of the pulsed laser beam was changed from 0.2 W to 5.0 W at intervals of 0.2 W.

(Result of Test 1)

(1) When the average power was 0.2 W, no breakable layer was formed.

(2) When the average power was in the range of 0.4 to 1.6 W, a good breakable layer was formed and no damage layer was formed above or below the breakable layer.

(3) When the average power was in the range of 1.8 to 2.8 W, a breakable layer was formed and a damage layer was formed above the breakable layer due to the reflection of the laser beam from the breakable layer previously formed.

(4) When the average power was in the range of 3.0 to 5.0 W, a breakable layer was formed and a damage layer was formed above the breakable layer due to the reflection of the laser beam from the breakable layer previously formed. Further, a damage layer was also formed below the breakable layer due to the transmission of the laser beam through the breakable layer previously formed.

In FIG. 5, the symbol "●" indicates the result that a good breakable layer was formed and no damage layer was formed above or below the breakable layer, the symbol "x" indicates the result that no breakable layer was formed, the symbol "Δ" indicates the result that a damage layer was formed only above the breakable layer, the symbol "□" indicates the result that damage layers were formed above and below the breakable layer, the symbol "◇" indicates the result that a damage layer was formed only below the breakable layer, and the symbol "+" indicates the result that no breakable layer was formed and only a damage layer was formed. Also in FIG. 8, these symbols "●," "x," "Δ," "□," "◇," and "+" are similarly used.

(Conclusion Based on Test 1)

In the case that the feed speed is 100 mm/second under the above test conditions, the average power of the pulsed laser beam is set to the range of 0.4 to 1.6 W, so as to form a good breakable layer.

(Test 2)

A single crystal SiC ingot having a thickness of 1 mm was held on the chuck table 22 and the pulsed laser beam was applied to the ingot as moving the chuck table 22 at a feed speed of 200 mm/second in the direction perpendicular to the direction of formation of the off angle, wherein the average power of the pulsed laser beam was changed from 0.2 W to 5.0 W at intervals of 0.2 W.

(Result of Test 2)

(1) When the average power was in the range of 0.2 to 0.4 W, no breakable layer was formed.

(2) When the average power was in the range of 0.6 to 2.0 W, a good breakable layer was formed and no damage layer was formed above or below the breakable layer.

(3) When the average power was in the range of 2.2 to 2.8 W, a breakable layer was formed and a damage layer was formed above the breakable layer due to the reflection of the laser beam from the breakable layer previously formed.

(4) When the average power was in the range of 3.0 to 5.0 W, a breakable layer was formed and a damage layer was formed above the breakable layer due to the reflection of the laser beam from the breakable layer previously formed. Further, a damage layer was also formed below the breakable layer due to the transmission of the laser beam through the breakable layer previously formed. In some case, a damage layer was formed only below the breakable layer.

(Conclusion Based on Test 2)

In the case that the feed speed is 200 mm/second under the above test conditions, the average power of the pulsed laser beam is set to the range of 0.6 to 2.0 W, so as to form a good breakable layer.

(Test 3)

A single crystal SiC ingot having a thickness of 1 mm was held on the chuck table 22 and the pulsed laser beam was applied to the ingot as moving the chuck table 22 at a feed speed of 300 mm/second in the direction perpendicular to the direction of formation of the off angle, wherein the average power of the pulsed laser beam was changed from 0.2 W to 5.0 W at intervals of 0.2 W.

(Result of Test 3)

(1) When the average power was in the range of 0.2 to 0.8 W, no breakable layer was formed.

(2) When the average power was in the range of 1.0 to 2.8 W, a good breakable layer was formed and no damage layer was formed above or below the breakable layer.

(3) When the average power was 3.0 W, a breakable layer was formed and a damage layer was formed above the breakable layer due to the reflection of the laser beam from the breakable layer previously formed.

(4) When the average power was in the range of 3.2 to 4.8 W, a breakable layer was formed and a damage layer was formed above the breakable layer due to the reflection of the laser beam from the breakable layer previously formed. Further, a damage layer was also formed below the breakable layer due to the transmission of the laser beam through the breakable layer previously formed.

(5) When the average power was 5.0 W, a breakable layer was formed and a damage layer was formed below the breakable layer due to the transmission of the laser beam through the breakable layer previously formed.

(Conclusion Based on Test 3)

In the case that the feed speed is 300 mm/second under the above test conditions, the average power of the pulsed laser beam is set to the range of 1.0 to 2.8 W, so as to form a good breakable layer.

(Test 4)

A single crystal SiC ingot having a thickness of 1 mm was held on the chuck table 22 and the pulsed laser beam was applied to the ingot as moving the chuck table 22 at a feed speed of 400 mm/second in the direction perpendicular to the direction of formation of the off angle, wherein the average power of the pulsed laser beam was changed from 0.2 W to 5.0 W at intervals of 0.2 W.

(Result of Test 4)

(1) When the average power was in the range of 0.2 to 1.8 W, no breakable layer was formed.

(2) When the average power was in the range of 2.0 to 3.2 W, a good breakable layer was formed and no damage layer was formed above or below the breakable layer.

(3) When the average power was in the range of 3.4 to 5.0 W, a breakable layer was formed and a damage layer was formed below the breakable layer due to the transmission of the laser beam from the breakable layer previously formed.

(Conclusion Based on Test 4)

In the case that the feed speed is 400 mm/second under the above test conditions, the average power of the pulsed laser beam is set to the range of 2.0 to 3.2 W, so as to form a good breakable layer.

(Test 5)

A single crystal SiC ingot having a thickness of 1 mm was held on the chuck table 22 and the pulsed laser beam was applied to the ingot as moving the chuck table 22 at a feed speed of 500 mm/second in the direction perpendicular to the direction of formation of the off angle, wherein the average power of the pulsed laser beam was changed from 0.2 W to 5.0 W at intervals of 0.2 W.

(Result of Test 5)

(1) When the average power was in the range of 0.2 to 2.8 W, no breakable layer was formed.

(2) When the average power was in the range of 3.0 to 3.6 W, a good breakable layer was formed and no damage layer was formed above or below the breakable layer.

(3) When the average power was in the range of 3.8 to 5.0 W, a breakable layer was formed and a damage layer was formed below the breakable layer due to the transmission of the laser beam from the breakable layer previously formed.

(Conclusion Based on Test 5)

In the case that the feed speed is 500 mm/second under the above test conditions, the average power of the pulsed laser beam is set to the range of 3.0 to 3.6 W, so as to form a good breakable layer.

(Test 6)

A single crystal SiC ingot having a thickness of 1 mm was held on the chuck table 22 and the pulsed laser beam was applied to the ingot as moving the chuck table 22 at a feed speed of 600 mm/second in the direction perpendicular to the direction of formation of the off angle, wherein the average power of the pulsed laser beam was changed from 0.2 W to 5.0 W at intervals of 0.2 W.

(Result of Test 6)

(1) When the average power was in the range of 0.2 to 3.6 W, no breakable layer was formed.

(2) When the average power was in the range of 3.8 to 4.0 W, a good breakable layer was formed and no damage layer was formed above or below the breakable layer.

(3) When the average power was in the range of 4.2 to 5.0 W, a breakable layer was formed and a damage layer was formed below the breakable layer due to the transmission of the laser beam from the breakable layer previously formed.

(Conclusion Based on Test 6)

In the case that the feed speed is 600 mm/second under the above test conditions, the average power of the pulsed laser beam is set to the range of 3.8 to 4.0 W, so as to form a good breakable layer.

(Test 7)

A single crystal SiC ingot having a thickness of 1 mm was held on the chuck table 22 and the pulsed laser beam was applied to the ingot as moving the chuck table 22 at a feed speed of 700 mm/second in the direction perpendicular to the direction of formation of the off angle, wherein the average power of the pulsed laser beam was changed from 0.2 W to 5.0 W at intervals of 0.2 W.

(Result of Test 7)

(1) When the average power was in the range of 0.2 to 1.0 W, no breakable layer was formed.

(2) When the average power was in the range of 1.2 to 5.0 W, no breakable layer was formed and only a damage layer was formed, wherein the damage layer becomes larger with an increase in average power.

(Conclusion Based on Test 7)

In the case that the feed speed is 700 mm/second under the above test conditions, no breakable layer is formed.

(Test 8)

A single crystal SiC ingot having a thickness of 1 mm was held on the chuck table 22 and the pulsed laser beam was applied to the ingot as moving the chuck table 22 at a feed speed of 800 mm/second in the direction perpendicular to the direction of formation of the off angle, wherein the average power of the pulsed laser beam was changed from 0.2 W to 5.0 W at intervals of 0.2 W.

(Result of Test 8)

(1) When the average power was in the range of 0.2 to 1.0 W, no breakable layer was formed.

(2) When the average power was in the range of 1.2 to 5.0 W, no breakable layer was formed and only a damage layer was formed, wherein the damage layer becomes larger with an increase in average power.

(Conclusion Based on Test 8)

In the case that the feed speed is 800 mm/second under the above test conditions, no breakable layer is formed.

Figure 6:
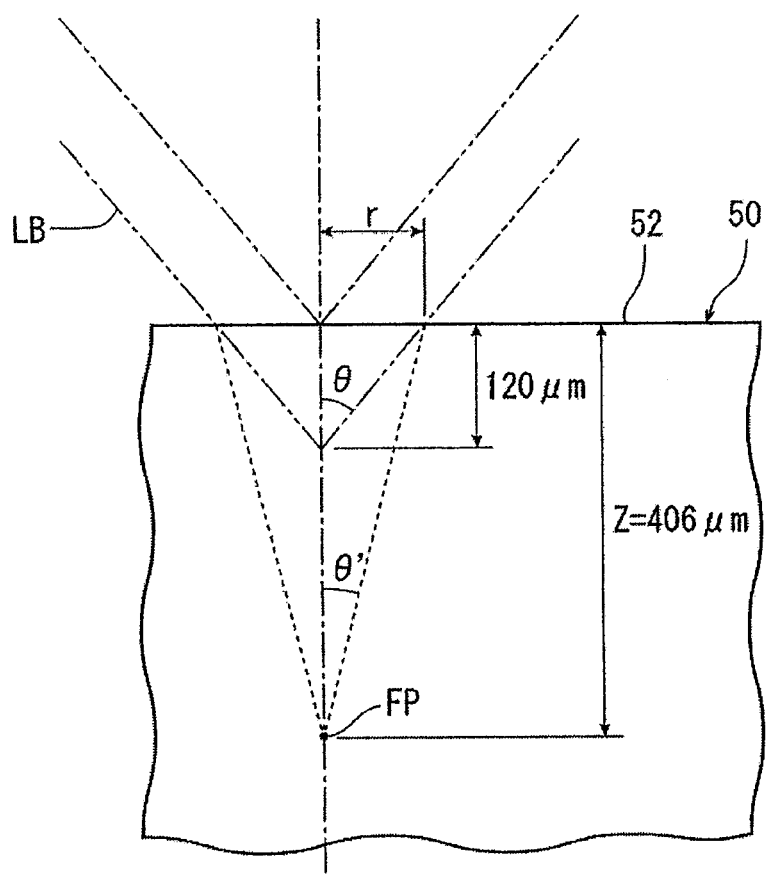
FIG. 6 is a schematic view depicting a laser beam applied to the SiC ingot.
Figure 7:
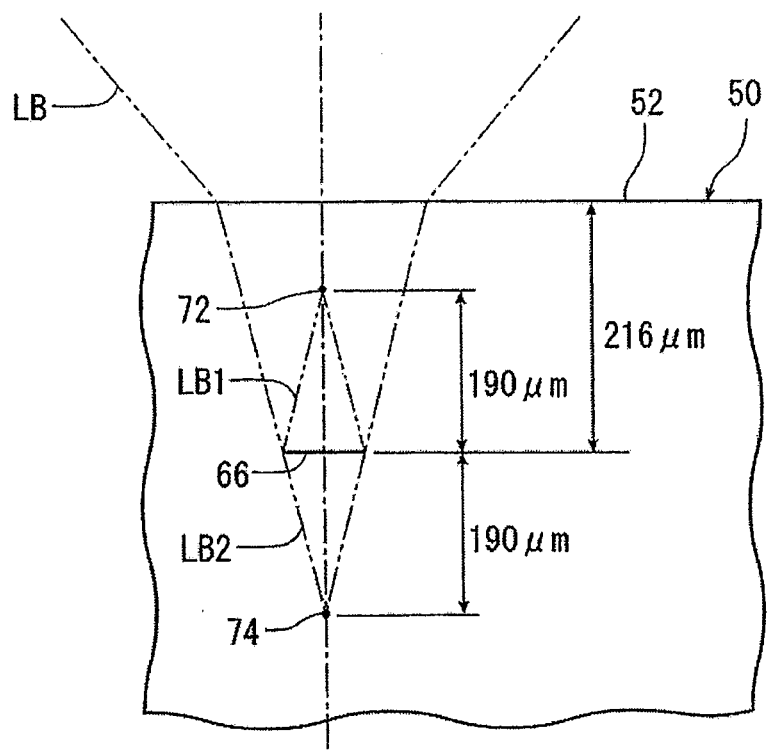
FIG. 7 is a schematic view depicting a modified layer formed inside the SiC ingot and a damage layer formed above or below the modified layer.

Referring to FIGS. 6 and 7, there are depicted the depth Z of the focal point FP of the pulsed laser beam LB applied to the ingot 50, the modified layer 66 formed in the ingot 50, and damage layers 72 and 74 formed in the ingot 50 above and below the modified layer 66. The numerical aperture NA of the focusing lens is expressed as NA=n·sin θ, where n is the refractive index of the medium where the focusing lens is located, and θ is the angular aperture. Under the above test conditions, the numerical aperture NA of the focusing lens is 0.65. Accordingly, the angular aperture θ of the pulsed laser beam LB transmitted through the focusing lens in the air (refractive index n≈1) becomes as follows:

$$\theta = \sin^{-1}(0.65)$$
$$= 40.5.$$

In the case that the focal point FP is lowered by 120 μm from the upper surface (e.g., the first surface 52) of the ingot 50, the radius r of a spot of the laser beam LB formed on the upper surface of the ingot 50 becomes as follows:

$$r = 120 \times \tan(40.5)$$
$$= 120 \times 0.854$$
$$= 102.5 (\mu m).$$

Further, the refractive index of SiC is 2.65. Accordingly, the aperture angle θ' of the pulsed laser beam LB in the ingot 50 becomes as follows:

$$\theta' = \sin^{-1}(0.65/2.65)$$
$$= \sin^{-1}(0.245)$$
$$= 14.2.$$

Accordingly, the depth Z of the focal point FP is given by the relation with the radius r of the spot of the pulsed laser beam LB formed on the upper surface of the ingot 50 and the angular aperture θ' in the ingot 50 as follows:

$$Z = r/\tan\theta'$$
$$= 102.5/\tan(14.2)$$
$$= 102.5/0.253$$
$$= 406 (\mu m)$$

The position of the modified layer 66 formed in Tests 1 to 6 was actually measured. As the result of this measurement, the depth of the modified layer 66 from the upper surface of the ingot 50 was 216 μm, and this depth was higher than the depth of the focal point FP by 190 μm. Due to the fact that the breakable layer 64 including the modified layer 66 and the cracks 68 is formed at the depth different from the depth of the focal point FP, there is a case that the damage layer 72 and/or the damage layer 74 are/is formed in the ingot 50. More specifically, when the pulsed laser beam LB is applied to the ingot 50 so as to overlap the breakable layer 64 previously formed, the pulsed laser beam LB may be reflected from the breakable layer 64, and the reflected pulsed laser beam LB1 may form the damage layer 72 at the depth higher than the breakable layer 64 by approximately 190 μm. Further, the pulsed laser beam LB may be transmitted through the breakable layer 64, and the transmitted pulsed laser beam LB2 may form the damage layer 74 at the depth lower than the breakable layer 64 by approximately 190 μm (this depth being substantially the same depth of the focal point FP). When the damage layer 72 or 74 is formed in the ingot 50, the quality of a wafer to be produced is decreased and the amount of the ingot 50 to be removed by grinding is increased to cause a reduction in productivity.

As apparent from the results of Tests 1 to 8 depicted in FIG. 5, the maximum average power for forming a good breakable layer 64 according to the feed speed V (mm/second) is 1.6 W for V=100 mm/second, 2.0 W for V=200 mm/second, 2.8 W for V=300 mm/second, 3.2 W for V=400 mm/second, 3.6 W for V=500 mm/second, 4.0 W for V=600 mm/second, unclear for V=700 mm/second, and unclear for V=800 mm/second. The energy density per pulse E (J/cm²) converted from this maximum average power is 0.737 J/cm² for V=100 mm/second, 0.922 J/cm² for V=200 mm/second, 1.29 J/cm² for V=300 mm/second, 1.474 J/cm² for V=400 mm/second, 1.65 J/cm² for V=500 mm/second, and 1.84 J/cm² for V=600 mm/second. As described above, the energy density E (J/cm²) is defined by the average power P (W), the area S=ΠD²/4 (cm²) of the spot at the position where the modified layer 66 is formed, and the repetition frequency F (kHz) to give E=P/(S·F). In the Tests 1 to 8, the diameter D of the spot at the position where the modified layer 66 is formed is given by the relation among the radius r (102.5 μm) of the spot formed on the upper surface of the ingot 50, the depth Z (406 μm) of the focal point FP, and the height (190 μm) of the modified layer 66 from the focal point FP as follows:

$$D = 102.5\,\mu m \times (190\,\mu m / 406\,\mu m) \times 2$$
$$= 96\,\mu m$$
$$= 0.0096\,cm.$$

Further, as apparent from the results of Tests 1 to 8 depicted in FIG. 5, the minimum average power for forming a good breakable layer 64 according to the feed speed V (mm/second) is 0.4 W for V=100 mm/second, 0.6 W for V=200 mm/second, 1.0 W for V=300 mm/second, 2.0 W for V=400 mm/second, 3.0 W for V=500 mm/second, 3.8 W for V=600 mm/second, unclear for V=700 mm/second, and unclear for V=800 mm/second. The energy density per pulse E (J/cm²) converted from this minimum average power is 0.184 J/cm² for V=100 mm/second, 0.276 J/cm² for V=200 mm/second, 0.461 J/cm² for V=300 mm/second, 0.921 J/cm² for V=400 mm/second, 1.382 J/cm² for V=500 mm/second, and 1.75 J/cm² for V=600 mm/second.

In Tests 1 to 8, the overlap rate of the adjacent spots at the position where the breakable layer 64 is formed changes according to the feed speed V (mm/second). That is, the overlap rate decreases with an increase in the feed speed V (mm/second) in such a manner that the overlap rate is 96% for V=100 mm/second, 93% for V=200 mm/second, 89% for V=300 mm/second, 86% for V=400 mm/second, 83% for V=500 mm/second, 80% for V=600 mm/second, 76% for V=700 mm/second, and 73% for V=800 mm/second. Accordingly, the maximum energy density E for forming a good breakable layer 64 changes according to the feed speed V. However, when the overlap rate is less than 80%, the breakable layer 64 is not formed.

Figure 8:
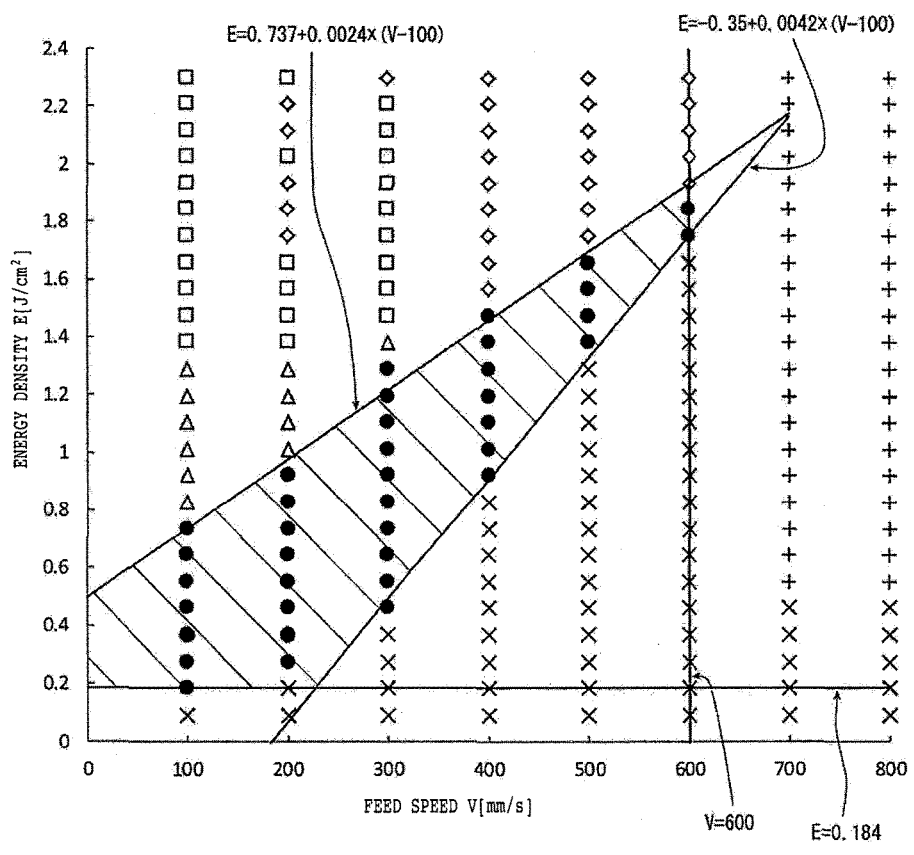
FIG. 8 is a graph depicting the correlation between a feed speed and an energy density.

FIG. 8 depicts the correlation between the feed speed V (mm/second) and the energy density per pulse E (J/cm²). In FIG. 8, the horizontal axis represents the feed speed V (mm/second) and the vertical axis represents the energy density per pulse E (J/cm²). As depicted in FIG. 8, the maximum energy density per pulse E for forming a good breakable layer 64 is plotted according to the feed speed V to perform linear approximation, thereby deriving E=0.737+0.0024×(V−100). Further, the minimum energy density per pulse E for forming a good breakable layer 64 is plotted according to the feed speed V to perform linear approximation, thereby deriving E=−0.35+0.0042×(V−100). Further, when the feed speed V is in the range of 100 to 600 mm/second, a good breakable layer 64 is formed, whereas when the feed speed V is 700 mm/second and 800 mm/second, a good breakable layer 64 is not formed. Accordingly, the condition of 0<V≤600 is set. Further, the minimum energy density per pulse E for forming a good breakable layer 64 is 0.184 J/cm² (average power of 0.2 W for V=100 mm/second) as apparent from the results of Tests 1 to 8. Accordingly, the condition of 0.184≤E is set. In conclusion, to form a good breakable layer 64 and prevent the formation of the damage layer 72 above the breakable layer 64 and/or the formation of the damage layer 74 below the breakable layer 64, the energy density per pulse E (J/cm²) and the feed speed V (mm/second) satisfy the following conditions:

$$0 < V \leq 600 \quad \text{(Eq. 1); and}$$

$$0.184 \leq E \quad \text{(Eq. 2).}$$

On the above conditions, the energy density per pulse E is set as follows:

$$-0.35 + 0.0042 \times (V-100) \leq E \leq 0.737 + 0.0024 \times (V-100) \quad \text{(Eq. 3).}$$

In FIG. 8, the hatched area is the area specified by Eqs. 1 to 3. By setting the relation between the energy density per pulse E (J/cm²) and the feed speed V (mm/second) so that Eqs. 1 to 3 hold, the damage layer 72 or 74 is not formed above or below the breakable layer 64. Accordingly, there is no possibility that the quality of a wafer to be produced may be reduced and that the amount of the ingot 50 to be removed by grinding may be increased to cause a reduction in productivity. As a result, the amount of an ingot portion to be discarded can be reduced to thereby improve the productivity.

Figure 9:
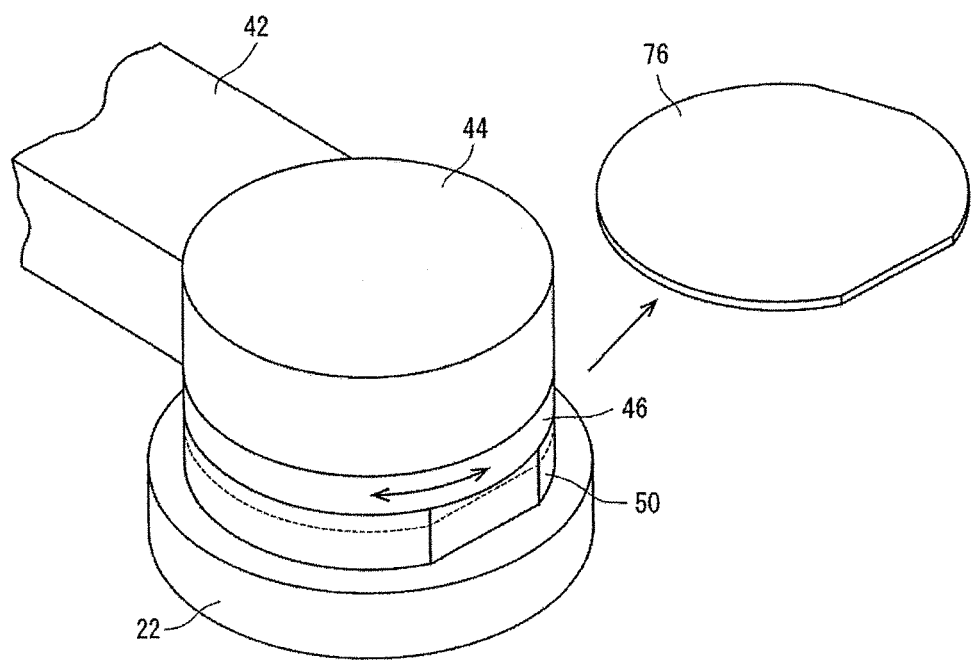
FIG. 9 is a perspective view depicting a wafer producing step.

After performing the separation surface forming step, a wafer producing step is performed to separate part of the ingot 50 along the separation surface 70 as an interface, thereby producing a wafer. In the wafer producing step, the moving means 8 is first operated to move the chuck table 22 to a position below the suction member 46. Thereafter, the elevating means provided in the casing 40 is operated to lower the arm 42 until the lower surface of the suction member 46 comes into close contact with the first surface 52 of the ingot 50 as depicted in FIG. 9. Thereafter, the suction means connected to the suction member 46 is operated to hold the first surface 52 of the ingot 50 to the lower surface of the suction member 46 under suction. Thereafter, the ultrasonic vibration applying means built in the suction member 46 is operated to apply ultrasonic vibration to the lower surface of the suction member 46. At the same time, the motor 44 is operated to rotate the suction member 46. As a result, part of the ingot 50 can be separated along the separation surface 70 as an interface to thereby efficiently produce a wafer 76 having a desired thickness as depicted in FIG. 9. After producing the wafer 76, the separation surface 70 of the ingot 50 remaining is polished by using polishing means (not depicted) provided on the base 4. Thereafter, the separation surface forming step and the wafer producing step are sequentially performed in a similar manner to produce a plurality of wafers from the ingot 50.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. An SiC wafer producing method for producing an SiC wafer from a single crystal SiC ingot having a first surface, a second surface opposite to said first surface, a c-axis extending from said first surface to said second surface, and a c-plane perpendicular to said c-axis, said c-axis being inclined by an off angle with respect to a normal to said first surface, said off angle being formed between said c-plane and said first surface, said SiC wafer producing method comprising:

a breakable layer forming step of setting a focal point of a pulsed laser beam having a transmission wavelength to SiC inside said SiC ingot at a predetermined depth from said first surface, said predetermined depth corresponding to the thickness of said SiC wafer to be produced, and next applying said pulsed laser beam to said SiC ingot as relatively moving said SiC ingot and said focal point in a first direction perpendicular to a second direction where said off angle is formed, thereby forming a breakable layer inside said SiC ingot at said predetermined depth, said breakable layer including a modified layer extending in said first direction and cracks extending from said modified layer in opposite directions along said c-plane, said modified layer being formed in such a manner that SiC is decomposed into Si and C by said pulsed laser beam first applied, and said pulsed laser beam next applied is absorbed by C previously produced to continue the decomposition of SiC into Si and C in a chain reaction manner with the relative movement of said SiC ingot and said focal point in said first direction;

a separation surface forming step of relatively indexing said SiC ingot and said focal point in said second direction and performing said breakable layer forming step plural times to thereby form a plurality of breakable layers constituting a separation surface; and a wafer producing step of separating a part of said SiC ingot along said separation surface as an interface to thereby produce said SiC wafer;

said separation surface forming step including the step of setting the energy density of said pulsed laser beam to an energy density not causing the formation of an upper damage layer above said breakable layer previously formed due to the reflection of said pulsed laser beam from said breakable layer or not causing the formation of a lower damage layer below said breakable layer previously formed due to the transmission of said pulsed laser beam through said breakable layer.

2. The SiC wafer producing method according to claim 1, wherein the energy density per pulse E (J/cm$^2$) of said pulsed laser beam and the feed speed V (mm/second) of said SiC ingot satisfy the conditions of 0<V≤600 and 0.184≤E and the energy density per pulse E is set to −0.35+0.0042×(V−100)≤E≤0.737+0.0024×(V−100).

* * * * *